United States Patent [19]
deMontigny et al.

[11] 4,043,977
[45] Aug. 23, 1977

[54] NON-STICK POLYORGANOSILOXANE COATING COMPOSITIONS

[75] Inventors: Armand deMontigny; Kurt-Wilhelm Eichenhofer; Hans Toepsch, all of Leverkusen; Reinhard Schliebs, Cologne, all of Germany

[73] Assignee: Bayer Aktiengesellschaft, Leverkusen, Germany

[21] Appl. No.: 670,583

[22] Filed: Mar. 25, 1976

[30] Foreign Application Priority Data

Apr. 9, 1975 Germany .............................. 2515484

[51] Int. Cl.$^2$ ............................................. C08G 77/04
[52] U.S. Cl. ...................... 260/46.5 UA; 260/46.5 G; 428/447
[58] Field of Search .................. 260/46.5 UA, 46.5 G; 428/447

[56] References Cited

U.S. PATENT DOCUMENTS 3,631,086  12/1971  Seyfried et al. .............. 260/448.2 E
3,652,615  3/1972   Parasko ....................... 260/46.5 UA Primary Examiner—Melvyn I. Marquis
Attorney, Agent, or Firm—Burgess, Dinklage & Sprung

[57] ABSTRACT

A composition for coating paper, films and fiber materials, comprising
a. 4 parts by weight of a linear polyorganosiloxane with ends stopped by vinyl groups and having a viscosity of up to about 500 cP (20° C) and
b. about 0.5 to 1.5 parts by weight of a crosslinking agent containing Si-vinyl units and SiH units and comprising molecules with a maximum of about 10 Si atoms bonded to one another via oxygen, and wherein the two reactive groups are present in adjacent positions in one and the same molecule and the remaining valencies of the Si atom are saturated by methyl groups and the SiH groups are present in a ratio of about 1:1 to 2.5:1 to the total amount of all Si-vinyl units present in the composition,
c. a platinum metal complex, the amount of metal being up to about 0.01 part by weight — based on 100 parts by weight of total composition, and
d. a diaziridine, the amount of diaziridine being about 75 to 250 times the weight of metal.

The compositon has a viscosity of about 150 cP — the increase of the initial viscosity over a period to of at least 24 hours being less than 1 cP — easy application from existing equipment.

7 Claims, No Drawings

NON-STICK POLYORGANOSILOXANE COATING COMPOSITIONS

The present invention relates to a coating agent based on polyorganosiloxanes which is suitable for the manufacture on non-stick films or coatings on paper, films, fabric tapes and similar materials, without the use of solvents.

The application of non-stick polysiloxane coatings from water or organic solvents onto paper or similar materials has in itself been known for a long time (compare, for example, Noll, Chemie und Technologie der Silicone (Chemistry and Technology of the Silicones), 2nd edition, 1968, Verlag Chemie, Weinheim, page 520) and is extensively carried out in industry. The apparatuses suitable for the application of such coatings are in general designed to apply a coating material which contains solvent and are therefore adjusted to deal with viscosities of less than 150 cP or even of less than 100 cP. Such low viscosities have the advantage that they can be adjusted very precisely by means of the solvent. In addition, dilute solutions can be processed better, and the substrate is generally wetted better. In spite of these advantages, such coating systems containing solvents still suffer from considerable shortcomings. The main disadvantage is that about 92–97% of the mixture applied must again be removed. This requires high expenditure of energy. Furthermore, for reasons of protection of the environment and reasons of profitability, it is necessary either to recover the solvent removed in this way or, if recovery is not possible, to destroy the solvent, for example by combustion. However, this requires considerable expenditure on energy or apparatuses in every case.

For these reasons there has been a constantly increasing demand for a coating without solvents, but of course it is a prerequisite that with a solvent-free coating system the advantage must not be achieved at the expense of a series of other disadvantages. Admittedly, some processes have already been disclosed (compare, for example, DT-OS (German Published Specification) No. 2,210,380 and DT-OS (German Published Specification No.) 2,321,879), in which the attempt to manage without solvents has been made. However, these systems in every case still suffer from a series of disadvantages so that they are unable satisfactorily to fulfil the demands made of them. Above all, it is in respect of their viscosity behavior — such systems are required to have a high degree of constancy of the viscosity — that the previously known systems have only been partially satisfactory.

A further aspect of the viscosity problem which also still awaits a satisfactory solution in spite of the previously known processes and compositions is the initial viscosity.

As is known to those skilled in the art, a mixture of a siloxane polymer with a crosslinking agent cannot directly be brought to a lower viscosity by shortening the siloxane chains of the polymer. Short-chain rubber molecules give a hard, crumbly film of low suppleness and poor mechanical properties. Applied to paper coating, this means that the film is not abrasion-resistant, and the inadequate abrasion resistance does not necessarily relate to the breaking of the bond between the substrate and the film but to the film itself breaking. Hence it is not surprising that all examples in the known publications relate to polymers of which the viscosity is in part many times higher than 150 cP.

Accordingly, it is the object of the present invention to provide a coating system or coating process which makes it posible to achieve, by means of the applicator units of the state of the art, thin, commercially acceptable films of which the uniformity and mechanical properties are such as to give constant release properties and migration properties which meet practical requirements. In detail, this means that such a process must resort to compositions which in spite of the low initial viscosities are able to give films which withstand mechanical strain and repel adhesives, while the original viscosity must remain constant for at least 24 hours under conditions resembling those encountered in practice.

This object is realized in accordance with the present invention pursuant to which there is provided a composition for coating paper, films and fiber materials, comprising a. 4 parts by weight of a linear polyorganosiloxane with ends stopped by vinyl groups and having a viscosity of up to about 500 cP (20° C), b. about 0.5 to 1.5 parts by weight of a crosslinking agent containing Si-vinyl units and SiH units, comprising molecules with a maximum of about 10 Si atoms bonded to one another via oxygen, and wherein the two reactive groups are present in adjacent positions in one and the same molecule and the remaining valencies of the Si atom are saturated by methyl groups and the SiH groups are present in a ratio of 2.5:1 to the total amount of all Si-vinyl units present in the composition, c. a platinum metal complex, the amount of metal being up to about 0.01 part by weight - based on 100 parts by weight of the composition, and d. a diaziridine, the amount of diaziridine being about 75 to 250 times the weight of metal.

Accordingly, it was possible to achieve the present object by making 4 parts by polyorganosiloxane with ends stopped by vinyl groups and having a viscosity of at most 500 cP/20° C with 0.5 to 1.5 parts of a crosslinking agent carrying Si-vinyl groups and SiH groups; the molecular size of the crosslinking agent should not exceed 10 Si atoms which are bonded via oxygen and of which the remaining valencies are saturated by methyl groups, where they are not occupied by the above reactive groups, and the viscosity of the polyorganosiloxane is so chosen that it is more than 50 cP and that the viscosity of the total mixture does not exceed 150 cP. The SiH:Si-vinyl ratio in the mixture may vary between the ratios of 1:1 and 2.5:1. The crosslinking agent used is such that it consists of one type of molecule and carries, in addition to SiH groups, a sufficient number of Si-vinyl groups that the above conditional ratios are observed.

While the linear polyorganosiloxane has a viscosity which may be as high as 500 cP/20° C, it is blended with such an amount of crosslinking agent that the overall composition has a viscosity from about 50 to 150 cP/20° C.

In the sense of the invention, polyorganosiloxanes with ends stopped by vinyl groups are polydiorganosiloxanes which terminate in $CH_2=CH-Si(CH_3)_2O_{\frac{1}{2}}$ units and of which the organo groups consist to the extent of at least about 70% of methyl groups, the remainder optionally consisting of higher alkyl groups, preferably containing up to about 6 carbon atoms, or phenyl groups. The viscosity of these polymers, which can be prepared easily according to the state of the art, should not be less than about 50 cP. Now the upper limit of viscosity is determined by the total viscosity of the mixture, which should be less than 150 cP; accordingly, the polymer viscosity should not significantly exceed a value of 500 cP.

The crosslinking agent consists, for example, of a co-hydrolysate which contains both vinyl-Si and H-Si groups in the same molecule. The following compounds would be typical representatives of this category of crosslinking agent, for example with the chain length remaining the same:

$(CH_3)_3SiOX_nY_{n'}Si(CH_3)_3$ $(CH_3)_3SiOX_nY_{n'}Si(CH_3)_2H$ $(CH_3)_3SiOX_nY_{n'}Si(CH_3)_2CH=CH_2$ $CH_2=CH(CH_3)_2SiOX_nY_{n'}Si(CH_3)_2CH=CH_2$ $CH_2=CH(CH_3)_2OX_nY_{n'}Si(CH_3)_2H$ and $HSi(CH_3)_2OX_nY_{n'}Si(CH_3)_2H$ wherein X denotes [Si(CH$_3$)O],
H Y denotes [Si(CH$_3$)O] and
CH=CH$_2$ $n+n'$ is at most about 8.

These compounds are readily available and are obtained in high yields by co-hydrolysis according to the state of the art. In principle, the crosslinking agent would be allowed to possess more than 10 Si atoms bonded via O without the crosslinking reaction or the properties of the film being impaired. However, it is to be borne in mind that this would increase the viscosity of the crosslinking agent and hence also the viscosity of the mixture. In order to counteract this effect brought about by the crosslinking agent the polymer would have to be made correspondingly short. In the viscosity ranges concerned, which are in any case already low, this would not be of advantage since an over-drastic shortening of the chains would be at the expense of the mechanical properties. It has been found that the film which results from the mixture described above adheres well to its substrate, is abrasion-resistant and exhibits perfect release properties and migration properties.

It is a further characteristic of the present invention that Pt catalyst known from the literature, such as the reaction product of H$_2$PtCl$_6$ with octanol (Lamoreaux catalyst) or Pt compounds such as have been disclosed, for example, in DT-OS (German Published Specification No.) 2,251,297 (the disclosure of which is incorporated herein by reference) are deactivated by bringing them into contact, at room temperature, with a diaziridine of the formula

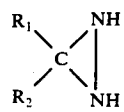

wherein

R$_1$ and R$_2$ represent a radical which contains up to 6 C atoms (for example an alkyl radical) and wherein R$_1$ + R$_2$ can together form a ring system. Examples of both liquid and solid diaziridines which can be used for this purpose are dimethyldiaziridine, methylethyldiaziridine, diethyldiaziridine, methylisopropyldiaziridine, methylpropyldiaziridine, dipropyldiaziridine, pentamethylenediaziridine and hexamethylenediaziridine. The reaction is best carried out "in situ", that is to say a sufficient amount of diaziridine is added to the polymer with ends stopped by vinyl groups and the platinum catalyst is then added. It has been found that up to about 100, preferably about 10 to 12 ppm, of Pt, relative to the total amount, suffice for catalysis so that reliable curing is achieved at temperatures between 120° and 150° C.

As can furthermore be shown in the examples which follow, good deactivation of the catalyst is achieved if the amount of diaziridine added is up to about 250 times the amount of Pt. The amount of diaziridine should not be significantly less than 75 times the amount of the Pt catalyst since in that case an increase in viscosity of 5 cP is already found over a period of 24 hours. If the diaziridine content is well matched to the amount of Pt catalyst, pot lives of over 120 hours can be achieved, without difficulties, under conditions resembling practical requirements. A main advantage of the low viscosity is that it permits the application of thin, economical films.

At this point it should further be mentioned that the delaying action of the reaction products of platinum complexes with diaziridines need not be restricted to systems of low viscosity such as those described here.

The present invention will now be explained in further detail with the aid of the examples which follow ("parts by weight" wherever used in the Examples means grammes):

EXAMPLE 1

1.8 parts by weight of methylethyldiaziridine were added to 970 parts by weight of a linear polymethylsiloxane with ends stopped by vinyl groups and having a viscosity of 116 cP, and the mixture was thoroughly stirred and mixed with 2 ml of a Pt complex (Example, DT-OS (German Published Specification No.) 2,251,297), corresponding to 25.6 mg of Pt. 240 parts by weight of a crosslinking molecule of the formula

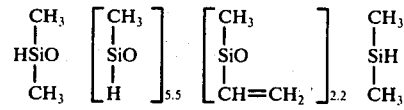

were added to this mixture.

Viscosity of the composition:
after 0 hour: 84.0 cP
after 24 hours: 89.0 cP

After 24 hours, the mixture was applied by means of a glass doctor blade onto a Kraft paper of 75 g/m$^2$ and was cured for 20 seconds at 150° C in a non-ventilated drying cabinet, to give an abrasion-resistant film.

Coating: 3.8 g/m$^2$

EXAMPLE 2

970 parts by weight of a linear polydimethylsiloxane with ends stopped by vinyl groups and having a viscosity of 120 cP were thoroughly stirred with 2.5 parts by weight of methylethyldiaziridine and 1 ml of Pt catalyst (according to DT-OS (German Published Specification No.) 2,251,297), corresponding to 12.8 mg of Pt, was added. 240 parts by weight of the crosslinking agent from Example 1 were stirred into this mixture. The constancy of the viscosity was tested for six days. The activity was checked by curing films, applied by means of glass doctor blades, for 20 seconds at 150° C.

| Storage time (hrs) | Viscosity cP | Abrasion | Release value | Reduction in adhesion |
|---|---|---|---|---|
| 0 | 83 | none | 20 g | 5% |
| 1 | 83 | none | 20 g | 8% |
| 5 | 83 | none | 15 g | 8% |
| 24 | 83 | none | 20 g | 5% |
| 93 | 85 | none | 25 g | 9% |
| 144 | 85 | none | 25 g | 10% |

The mixtures were stored in heat-insulated vessels so that any heat generated by the reaction had as little opportunity as possible to be dissipated. The compositions remained in contact with the atmosphere.

EXAMPLE 3

35 kg of a mixture prepared according to Example 2 were used on a paper-coating machine of which the applicator was provided with a 60-screen roller. The curing temperature was 140° C and the heat contact time was about 12 seconds. A thin, well-cured, adhesive-repellent film formed.

Coating: about 1 g/m²

Release values — measured with a 2.5 cm wide tape No. 659 from Messrs, Beiersdorf. All samples were subjected to a load of 60 g:

after 24 hours at 22° C: 10 g/2.5 cm
after 24 hours at 60° C: 12 g/2.5 cm
Reduction in adhesion: 22° C: 8%

EXAMPLE 4

2.5 g of a Lamoreaux Pt catalyst, corresponding to 13.2 mg of Pt, were added to 970 parts by weight of a polydimethylsiloxane with ends stopped by vinyl groups, of viscosity = 120 cP, containing 2.5 g of methylethyldiaziridine. Curing at 140° C for 25 seconds gave an abrasion-resistant film with good non-stick properties towards the adhesive tape of Example 3. 200 parts by weight of a product analogous to the crosslinking agent from Example 1, having a vinyl content of 3.15 milliequivalents of Si-vinyl/g and 11.71 milliequivalents of SiH/g had been added.

Viscosity: at time
$t = 0$: 81 cP
$t = 24$: 81.5 cP

EXAMPLE 5

The methylethyldiaziridine in Example 2 was replaced by a pentamethylenediaziridine and the crosslinking agent was replaced by the crosslinking agent from Example 4.

An abrasion-resistant film with good adhesive-repellent properties was obtained at 150° C with 25 seconds' curing time.

Viscosity: at time
$t = 0$: 80.5 cP
$t = 24$: 81.5 cP

It will be appreciated that the instant specification and examples are set forth by way of illustration and not limitation, and that various modifications and changes may be made without departing from the spirit and scope of the present invention.

What is claimed is:

1. A composition for coating paper, films and fiber materials, comprising
   a. 4 parts by weight of a linear polyorgano siloxane with ends stopped by vinyl groups and having a viscosity of up to about 500 cP (20° C) and
   b. about 0.5 to 1.5 parts by weight of a crosslinking agent containing Si-vinyl units and SiH units and comprising molecules with a miximum of about 10 Si atoms bonded to one another via oxygen, and wherein the two reactive groups are present in adjacent positions in one and the same molecule and the remaining valencies of the Si atom are saturated by methyl groups and the SiH groups are present in a ratio of about 1:1 to 2.5:1 to the total amount of all Si-vinyl units present in the composition,
   c. a platinum metal complex, the amount of metal being up to about 0.01 part by weight - based on 100 parts by weight of total composition, and
   d. a diaziridine of the formula

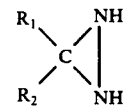

wherein $R_1$ and $R_2$ each individually is an alkyl radical containing up to 6 carbon atoms or $R_1 + R_2$ are pentamethylene or hexamethylene, the amount of diaziridine being about 75 to 250 times the weight of said metal.

2. The composition of claim 1, wherein the amount of said metal is about 10 to 100 ppm of total composition.

3. The composition of claim 1, wherein at least about 70% of the organo groups of the linear polyorganosiloxane other than the vinyl end groups are methyl groups and the balance are higher alkyl or phenyl groups, the polyorganosiloxane having a viscosity of about 50 to 500 cP/20° C.

4. The composition of claim 1, wherein at least about 70% of the organo groups of the linear polyorganosiloxane other than the vinyl end groups are methyl groups and the balance are higher alkyl or phenyl groups, the polyorganosiloxane having a viscosity of about 50 to 500 cP/20° C, the amount of metal is about 10 to 12 ppm of the total composition, and the composition has a viscosity of about 50 to 150 cP/20° C.

5. Paper, film or fiber material coated with a composition according to claim 1.

6. Paper, film or fiber material coated with a composition according to claim 4.

7. In a composition comprising a polyorganosiloxane having vinyl end groups, a crosslinking agent therefor, and a platinum-containing catalyst, the improvement which comprises a diaziridine in about 75 to 250 times the weight of platinum, whereby crosslinking is retarded.

* * * * *